United States Patent [19]

Kopp et al.

[11] Patent Number: 4,797,320

[45] Date of Patent: Jan. 10, 1989

[54] COMPOSITE PLASTIC MOLDINGS AND A PROCESS FOR THEIR PRODUCTION

[75] Inventors: Richard Kopp, Cologne; Gerhard Grögler, Leverkusen; Heinrich Hess, Leverkusen; Hermann Schäfer, Leverkusen; Werner Rasshofer, Cologne, all of Fed. Rep. of Germany

[73] Assignee: Bayer Aktiengesellschaft, Leverkusen, Fed. Rep. of Germany

[21] Appl. No.: 140,468

[22] Filed: Jan. 4, 1988

[30] Foreign Application Priority Data

Jan. 10, 1987 [DE] Fed. Rep. of Germany ....... 3700572

[51] Int. Cl.$^4$ .......................... B29C 67/20; B32B 3/26
[52] U.S. Cl. .................. 428/316.6; 264/46.4; 264/46.6; 428/318.6; 428/319.3; 428/423.3
[58] Field of Search ............................. 264/46.4, 46.6; 428/304.4, 316.6, 318.6, 319.3, 423.1, 423.3

[56] References Cited

U.S. PATENT DOCUMENTS

| 4,060,439 | 11/1977 | Rosemund | 428/316.6 |
| 4,576,855 | 3/1986 | Okina et al. | 428/318.6 |
| 4,680,367 | 7/1987 | Kopp et al. | 528/44 |

FOREIGN PATENT DOCUMENTS 0161477  11/1985  European Pat. Off. .
2948419   8/1981  Fed. Rep. of Germany .

Primary Examiner—William J. Van Balen
Attorney, Agent, or Firm—Gene Harsh; Joseph C. Gil; Lyndanne M. Whalen

[57] ABSTRACT

A composite plastic molding made up of a plastic foam and having a polyurethane skin is made by heating a reactive one-component system for form a polyurethane skin and then joining the polyurethane skin to the plastic foam. The one-component system is composed of a finely divided polyisocyanate in which from 0.1 to 25 equivalent percent of the isocyanate groups have been deactivated, a polyamine and/or polyol having a molecular weight of from 400 to 8000 and optionally a chain extending agent, a catalyst and known auxiliaries and additives.

16 Claims, No Drawings

COMPOSITE PLASTIC MOLDINGS AND A PROCESS FOR THEIR PRODUCTION

BACKGROUND OF THE INVENTION

The present invention relates to composite plastic moldings having a solid, thin skin and a foamed backing layer and a process for their production. Such moldings are widely used in the manufacture of interior parts for motor vehicles, such as instrument panels, center consoles, arm rests or door inner panels.

In the production of such composite plastic moldings, the solid skin is generally produced in a known manner from a thermoplast in a first step. This step is carried out in a suitable mold, for example by deep drawing of an ABS film or by slush molding from a PVC plasticizer plastisol or a PVC powder containing polymeric plasticizers. A PVC skin is often preferred to an ABS skin by virtue of its more pleasant feel.

In a second step, the solid skin produced in the first step is back-foamed with a suitable plastic either in the same mold (deep drawing) or after transfer to a second mold (slush molding). By virtue of their excellent foamability and the range of variation of the physical properties of the foam, polyurethane(urea) systems are generally used for this back-foaming step.

Under certain loads, however, composite plastic moldings of this type are affected by serious problems, particularly where the skin is based on PVC. The PVC contains stabilizers and plasticizers which have a certain vapor pressure and, hence, can lead to the emission of unpleasant odors and to a permanent coating on the windows of the automobile from inside.

In addition, the effect of heat on the composite material (dashboards can become heated to surface temperatures of >100° C., depending upon color and insulation) produces considerable interaction between the outer skin and the foam backing, which can lead to delamination, embrittlement of the outer skin and degradation of the backing foam.

Several attempts have been made to overcome this drawback. For example, special stabilizers for the PVC skin have been used. An intermediate layer between the skin and the backing foam to prevent the migration of plasticizers and additives (See EP No. 0,161,477) has also been employed.

However, these measures which seriously restrict the choice of additives and/or lead to additional cost generating process steps do not result in a significant improvement.

Consideration has been given to producing the solid skin and backing foam in a single step from a polyurethane system in the form of a so-called integral foam having a compact skin using the reaction injection molding process. In this case, however, reaction injection molding produces certain disadvantages, despite the saving of time. In such moldings, the skin and foam backing would have to be made of the same material. It would not be possible to make the skin, for example, from a light-stable, pigmented system and the foam backing from a simple, inexpensive system or to use systems having different mechanical properties for the skin and backing. In addition, it would be difficult to adjust the thickness of the skin as required within wide limits. The occasionally large and complicated undercuts of the moldings to be produced would also represent a certain problem in terms of mold design.

Another alternative for the production of a polyurethane skin is the in-mold coating process, in which the inside of the mold is first sprayed using a one-component or two-component spray or mixing head with enough material to form a layer a few tenths of a millimeter thick. However, considerable problems are created by the necessarily thin coating applied by a spray or mixing head. For example, the coating materials tend to run down vertical walls and mold undercuts are virtually impossible to achieve by this process.

The deep drawing of a polyurethane film is another method of forming a polyurethane skin. However, this process is subject to the same problems as the deep drawing of films of other materials. The deep-drawn skin has an irregular thickness (uneven stretching) and complicated mold geometries, such as undercuts are virtually impossible to achieve.

A polyurethane skin could also be formed by the slush molding of a polyurethane thermoplast powder. This process is known in the case of PVC powders. However, mold temperatures above 180° C. would be necessary and the energy costs would be very high.

SUMMARY OF THE INVENTION

It has now surprisingly been found that the processing and property problems discussed above can be solved if a skin of a special polyurethane material (namely a skin made from a one-component polyurethane system) is used for a plastic foam, preferably a polyurethane foam. These systems may be hardened at low temperatures (generally around 100° C.) to form moldings of any shape. No degrading interaction between the two layers occurs by virtue of the similar synthesis components and additives and, in addition, adhesion between the two layers is excellent. The one-component polyurethane system is composed of a polyisocyanate in which 0.1 to 25 equivalent percent of the isocyanate groups have been deactivated and a polyamine and/or polyol having a molecular weight of from 400 to 8000.

DETAILED DESCRIPTION OF THE INVENTION

The present invention relates to a composite plastic molding composed of a plastic foam and an optionally foamed polyurethane skin joined thereto. The polyurethane skin is obtained by thermal hardening of a storable, one-component reactive polyurethane system containing (A) a finely divided polyisocyanate in which from 0.1 to 25 equivalent percent of the NCO groups have been deactivated in a known manner, for example, by reaction with polyamines, hydrazines, alkyl hydrazines, hydrazides, amidines and/or guanidines, (B) a polyamine and/or polyol having a molecular weight of from 400 to 8000 and preferably of from 800 to 3000;

(C) optionally an aromatic polyamine having a molecular weight of from 108 to 399 and/or an aliphatic and/or cycloaliphatic polyol having a molecular weight of from 62 to 399 as a chain-extending agent, (D) optionally a catalyst and (E) optionally auxiliaries and additives.

The present invention also relates to a process for the production of such composite plastic moldings in which the one-component polyurethane system is thermally hardened and joined to the plastic foam. In a preferred embodiment of the process of the present invention, the polyurethane skin is first formed on the inner wall of the mold and subsequently removed from the mold. The polyurethane skin thus formed is introduced into a second mold and backfoamed therein with the plastic foam. The plastic foam is preferably a polyurethane foam.

Suitable one-component polyurethane systems, which are in the form of liquid or solid dispersions at room temperature, and their production and general use are known and are described, for example, in DE-OS No. 3,230,757/EP-A No. 103,323; DE-OS No. 3,403,500/EP-A No. 150,790; DE-OS No. 3,418,430/EP-A No. 162,364; DE-OS No. 3,419,429/EP-A No. 165,437: DE-OS No. 3,112,054/EP-P No. 62,780; DE-OS No. 3,228,670/EP-A No. 100,507; DE-OS No. 3,228,724/EP-A No. 100,507; DE-OS No. 3,228,723/EP-A No. 100,508 and DE-OS No. 3,343,124/EP-A No. 145,999.

Systems such as these contain (A) a surface-modified, finely divided polyisocyanate in which from 0.1 to 25 equivalent percent of the NCO groups of the solid finely divided polyisocyanates have been deactivated at the surface, preferably by reaction with a polyamine, hydrazine, alkyl hydrazine, hydrazide compound, amidine and/or guanidine compound, (B) a relatively high molecular weight aliphatic and/or aromatic polyamine or relatively high molecular weight polyol having a molecular weight of from 400 to 8000 and preferably from 800 to 3000 and, optionally, a polyol having a molecular weight of from 8001 to 12,000, optionally (C) a chain-extending agent in the form of an aromatic polyamine having a molecular weight of from 108 to 399 and/or an aliphatic and/or cycloaliphatic polyol having a molecular weight of from 62 to 399, optionally (D) a catalyst known in polyurethane chemistry and, optionally (E) standard auxiliaries and additives such as flow promoters, degassing promoters, agents for reducing adhesion to the mold wall, agents for improving adhesion to the backing foam or to lacquer layers to be applied, dyes, fillers, plasticizers, antistatic agents, light stabilizers, antioxidants, blowing agents, surfactants, flameproofing agents, fungicides and bactericides.

Suitable starting components for the surface-modified stabilized solid polyisocyanates (A) used in the present invention include any diisocyanate or polyisocyanate or mixture thereof which has a melting point above 40° C., preferably above 80° C. and more preferably above 130° C.

Particular preference is attributed to dimeric 1-methyl-2,4-diisocyanatobenzene, dimeric 4,4′-diisocyanatodiphenylmethane, 3,3′-dimethyl-4,4′-diisocyanatodiphenyl, 3,3′-diisocyanato-4,4′-dimethyl-N,N′-diphenylurea, bis-N,N′-[4-(4-isocyanatophenylmethyl)phenyl]-urea, 1,5-naphthalene diisocyanate and 1,4-phenylene diisocyanate. The dimeric diisocyanates may also be prepared in finely divided form by in situ dimerization, for example in plasticizers, solvents, water or polyols, and may optionally be subjected to stabilization in that form.

In addition to hydrazines, alkyl hydrazines, hydrazides, amidines and/or guanidines, bifunctional or polyfunctional, low molecular weight or relatively high molecular weight compounds containing aliphatically bound, primary and/or secondary amino groups and having a molecular weight of from 60 to about 6000 and preferably from 60 to 3000 (for example, ethylene diamine, 1,6-diaminohexane, diethylenetriamine, isophoronediamine and bis-(4-amino-3-methylcyclohexyl)methane) are often used as stabilizers for the polyisocyanates mentioned.

These stabilizers are generally used in a quantity of from 0.1 to 25 equivalent percent of each equivalent NCO, preferably in a quantity of from 0.1 to 8 equivalent percent and more preferably in a quantity of from 0.3 to 3 equivalent percent.

In general, the stabilization of the isocyanate solid at room temperature takes only a few minutes. The stabilization reaction may therefore be carried out continuously.

Component (B) may be any polyamino compound containing from 2 to 4, preferably 2 or 3 aromatic amino groups and having a molecular weight of from 400 to 8000. Polyamino compounds of the type produced by hydrolysis (preferably basic hydrolysis) of corresponding NCO prepolymers based on polyhydroxyl compounds of relatively high molecular weight and excess aromatic diisocyanate(s) are preferred. Examples of such polyamines can be found in DE-A No. 2,948,419, DE-A No. 3,039,600, DE-A No. 3,112,118, EP-A No. 61 627, EP-A No. 71 132, EP-A No. 71 139 and No. 97 869. DE-A No. 2,948,419 also describes state-of-the-art processes for the production of aromatic amino compounds of relatively high molecular weight suitable for use in the process of the present invention. The processes disclosed in DE-A No. 2,948,419 and the other patent specifications identified above are preferably used for the production of polyether polyamines and also polyester, polyacetal, polythioether and polycaprolactone polyamines, preferably 2- or 3-functional polyamines which contain urethane groups (from the reaction of the corresponding relatively high molecular weight polyhydroxyl compounds with the excess polyisocyanates) and which carry the amino groups at the site of the former polyisocyanate group. However, the aromatic relatively high molecular weight polyamines may also be produced by other processes such as reaction of NCO prepolymers with excess quantities of hydrazine, aminophenylethylamine or other diamines in accordance with DE-AS No. 1,694,152. In another possible method which is described in FR-P No. 1,415,317, the NCO prepolymers are converted with formic acid into the N-formyl derivatives and saponified. The reaction of NCO prepolymers with sulfamic acid in accordance with DE-AS No. 1,155,907 also leads to relatively high molecular weight polyamines. In addition to amino groups attached to aromatic radicals (from aromatic polyisocyanates), it is also possible to produce relatively high molecular weight polyamino compounds containing amino groups attached to aliphatic radicals (via aliphatic polyisocyanates). The relatively high molecular weight polyamines may even be pre-extended by reaction with substoichiometric quantities of diisocyanates.

Component (B) may also be a polyhydroxyl compound containing from 2 to 8 and preferably from 2 to 4 hydroxyl groups and having a molecular weight of from 400 to 8000. Such polyol is used both as suspension medium for the polyisocyanate and also as a reactive component. These compounds include polyesters, polyethers, polythioethers, polyacetals, polycarbonates, polylactones and polyesteramides containing at least two hydroxyl groups, polybutadiene compounds and mixtures thereof known to be useful for the production of homogeneous, optionally cellular or foam-like polyurethanes (See e.g., DE-OS No. 2,920,501). Polyethers and polyesters are particularly preferred.

Other representatives of such compounds are described in detail, for example, in High Polymers, Vol. XVI, "Polyurethanes, Chemistry and Technology", edited by Saunders-Frisch, Interscience Publishers, New York, London, Vol. I, 1962, pages 32 to 42 and pages 44 to 54 and Vol. II, 1964, pages.5 to 6 and 198 to 199 and in Kunststoff-Handbuch, Vol. VII, Vieweg-Hochtlen, Carl-Hanser-Verlag, Munich, 1966, for example on pages 45 to 71, and in DE-A No. 2,854,384.

It is of course possible to use mixtures of the above-mentioned polyamino and/or polyhydroxyl compounds.

Any aromatic polyamine having a molecular weight of from 108 to 399 including amines in which the amino group is attached to heterocyclic radicals of aromatic character may be used as Component (C). Examples of such polyamines include: p-phenylenediamine, 2,4/2,6-toluylenediamines, diphenylmethane-4,4'- and/or -2,4'- and/or -2,2'-diamines, 3,3'-dichloro-4,4'-diaminophenylmethane, 3-($C_1$–$C_8$)-alkyl-4,4'-diaminodiphenylmethanes, 3,3'-di-($C_1$–$C_4$)-alkyl-4,4'-diaminodiphenylmethanes and 3,3',5,5'-tetra-($C_1$–$C_4$)alkyl-4,4'-diphenylmethanes, 4,4'-diaminodiphenylsulfides, sulfoxides and sulfones, diamines containing ether groups according to DE-A Nos. 1,770,525 and 1,809,172 (U.S. Pat. Nos. 3,654,364 and 3,736,295), 2-halogen-1,3-phenylenediamines optionally substituted in the 5-position (DE-A Nos. 2,001,772, 2,025,896 and 2,065,869), bisanthranilic acid esters (DE-A Nos. 2,040,644 and 2,160,590), 2,4-diaminobenzoic acid esters according to DE-A No. 2,025,900 and toluylene diamines substituted by one or two ($C_1$–$C_4$) alkyl groups. 3,5-diethyl-2,4- and/or -2,6-diaminotoluene (particularly their technical (80/20) or (65/35) isomer mixtures) are particularly preferred.

Component (C) may also be any aliphatic and/or cycloaliphatic polyol having a molecular weight of from 62 to 399. Examples of such polyols include: ethylene glycol, trimethylene glycol, 2,3- and/or 1,4-butanediol, 1,6-hexanediol, neopentyl glycol, 1,4-bis-hydroxyethyl cyclohexane, 1,4-dihydroxycyclohexane, terephthalic acid-bis-($\beta$-hydroxyethyl)-ester, 1,4,3,6-dianhydrohexitols, 1,4-monoanhydrotetritols, and diols containing secondary hydroxyl groups, for example propylene glycol, 2,3-butane-diol or 2,5-pentanediol. Suitable polyfunctional compounds include trimethylolpropane, trimethylolethane, 1,2,6-hexanetriol, glycerol, pentaerythritol, quinitol, mannitol, sorbitol, castor oil, di-, tri- and tetraethylene, -propylene and -butylene glycols, bis-(2-hydroxyethyl)-hydroquinone, bis(2-hydroxyethyl)-resorcinol, formose and formitol. Diols and polyols containing tertiary amines (for example, N-methyl diethanolamine, triethanolamine and N,N'-bis-hydroxyethyl piperazine) are also suitable.

Suitable catalysts (D) include the usual polyurethane catalysts. Organolead and/or organotin compounds may be used to particularly good effect, optionally in conjunction with other typical polyurethane catalysts, particularly catalysts containing tertiary amines.

The auxiliaries and additives known in polyurethane chemistry may be used as Component (E). Examples thereof are given above at page 5, lines 25–32.

The NCO/($NH_2$+OH) ratio i.e. the ratio of free NCO from polyisocyanate stabilized (for example, with amines) or the sum of free NCO groups and NCO groups reacted for example with amidine and optionally more free polyisocyanate, to amino groups and/or OH groups (from relatively high molecular weight polyamines and/or polyols (B) and/or chain-extending agents (C)) in the formation of the skin is from 0.5:1 to 1.5:1, preferably from 0.8:1 to 1.5:1 and more preferably from 0.95:1 to 1.2:1 (figures in equivalents).

The one-component systems optionally containing a catalyst are hardened largely by heat shock. At room temperature or slightly elevated temperature, there is surprisingly no crosslinking reaction, even in the presence of highly effective catalysts, so that catalyst-containing mixtures may be described as storable one-component systems.

The polyurethane skin is formed from these one-component systems storable at room temperature in a thickness of from 0.01 to 10 mm and generally from 0.2 to 2.0 mm, preferably in a first process step. Various processes may be used, depending upon the existing parameters (mold geometry, aggregate state of the one-component dispersion). Suitable processes include: slush molding, spray coating, knife coating, dip coating, centrifugal coating and other state-of-the-art processes.

Slush molding is generally used for the production of skins for interior parts of motor vehicles. The slush molding process uses a processing unit composed of a reservoir for the one-component system and a contour-imparting half-shell mold of any shape. The reservoir contains a sufficient quantity of the liquid or finely powdered one-component system to at least completely fill the mold half. At the beginning of the process cycle, the mold half preheated to the hardening temperature of the one-component system is fixed to the reservoir containing the one-component system. The apparatus is then turned about a horizontal axis in such a way that the mold half is situated beneath the reservoir and is completely filled with the one-component system which immediately begins to gel on the hot mold wall. After a certain time, in which a sufficiently thick layer has gelled, the entire unit is returned to the starting position.

After unhardened one-component mixture has drained off, the mold half containing the gelled skin is removed and optionally afterheated in an oven. Thereafter the hardened skin may be removed from the mold half, optionally after a cooling step. The entire cycle may then be begun again.

The one-component polyurethane systems used are distinguished from all other materials and processes by the following advantages:
(1) it is possible to produce moldings of any geometry;
(2) the hardened material shows outstanding composite properties in combination with polyurethane backing foams:
(3) the final properties may be varied over a wide range;
(4) the product contains no volatile constituents; and
(5) hardening takes place under very mild conditions.

For layer thicknesses of approximately 1 mm, a hardening time of around 1 to 4 minutes at a mold half temperature of 110°–140° C. is required for the described one-component systems. The energy-saving conditions represent a major advantage over other materials, particularly thermoplastics, which generally require processing temperatures of $\geq$250° C., such as for example polyethylene at 275° C. (See EP No. 47,038, EP No. 47,039) and PVC plastisols at $\geq$280° C. (See JA No. 55/025 390=Derwent-Abstract OD-80/024 535).

The skin produced in the first step is then placed in a second mold shell where any plastic or metal inserts necessary are introduced. The skin is then back-filled with foam through a hole in the closed mold.

Processes and suitable polyurethane foam systems are known and are described in detail in Becker/Braun: Kunststoff-Handbuch, Vol. 7 (editor Gunter Oertel), Carl Hanser Verlag, Munich, Vienna, 1983, pages 235–245.

However, other known processes may also be used for the production of the composite plastic moldings of the present invention.

The final molding may optionally be aftertreated by known methods, for example by coating or lacquering of the skin, particularly where it is not stable to light. The skin may also be lacquered by in-mold coating or painting. In slush molding, for example, this is done by filling the mold with a liquid lacquer system and then emptying it again. The thin film left behind is hardened when the mold is heated to form the skin from the one-component system and then forms an intimate bond with the skin.

The composite plastics of the present invention are distinguished by excellent adhesion between the skin and the plastic foam, by very high temperature stability of the bond and by the fact that the skin can be formed easily and quickly.

The invention is further illustrated but is not intended to be limited by the following examples in which all parts and percentages are by weight unless otherwise specified.

EXAMPLES

EXAMPLE 1

(1a) One-component system for the skin 100 parts by weight of a polyoxypropylene glycol polyether containing terminal aromatic amino groups and having an NH number of 47.5 (prepared in accordance with DOS No. 2,948,419 by hydrolysis of a prepolymer of 1 mole polyoxypropylene glycol, MW 2000, and 2 moles 2,4-toluylene diisocyanate) and 0.2 part by weight of 4,4'-diamino-3,3'-dimethyl dicyclohexylmethane were mixed with 2Z.2 parts by weight of a finely divided polyisocyanate containing urea groups and which had been obtained by reaction of 2 moles 2,4-toluylene diisocyanate with 1 mole of water in acetone and had an NCO content of 20.35%. The liquid mixture hardened at around 110° C. to form a polyurethane elastomer having the following properties:

Tensile strength (DIN 53 504): 13.2 MPa.
Elongation at break (DIN 53 504): 450%.
Tear propagation resistance (DIN 53 515): 32.1 KN/m.
Shore hardness (DIN 53 505): A: 93; D:43.
Elasticity (DIN 53 512): 42%.

(1b) Rigid foam system for back-filling

A polyol mixture (OH number 500, water content 0.3 wt. %, viscosity 2500 mPas at 25° C.) composed of 60 parts by weight of a polyether (OH number 860) obtained by addition of propylene oxide to trimethylolpropane and 40 parts by weight of a polyether (OH number 42) obtained by addition of a mixture of propylene oxide and ethylene oxide to a mixture of trimethylolpropane and propylene glycol (molar ratio 3:1): 1.0 part by weight of a commercially available polysiloxane-polyalkylene oxide block copolymer as foam stabilizer OS 50, Goldschmidt AG, Essen, W. Germany; 3.0 parts by weight of N-dixethylbenzylamine and 0.5 part by weight of tetramethyl guanidine as catalysts; 3.0 parts by weight of amidoamine-oleic acid salt prepared from 1 mole of 3-dimethylamino-1-propylamine and 2 moles of oleic acid as internal release agent: 0.2 part by weight of 85 wt. % aqueous orthophosphoric acid as reaction retarder was mixed with a polyisocyanate obtained by phosgenation of anilineformaldehyde condensates (viscosity of 130 mPas at 25° C. and an NCO content of 31 wt. %.) 100 parts by weight of polyol mixture were mixed with a mixture of 133 parts by weight of the polyisocyanate and 10 parts by weight of trichlorofluoromethane.

Cream time: 14 seconds.
Gel time: 20 seconds.

(1c) Apparatus: heatable hinged steel mold, volume 20×20×1 cm³.

(1d) Production of the composite material

First, the steel mold heated to 150° C. was sprayed over its surfaces coming into contact with the molding with the release agent Indrosil 2000, a product of Budroma Chemikalien, D 6232 Bad Soden 2, Postfach 2228, and then provided with an approximately 1 mm thick layer of the one-component system for the skin.

The pasty one-component system mixture degassed in vacuo was applied to the mold wall using a flat brush. The system solidified into a thin, flexible film within a few seconds. The operation was repeated until the required layer thickness on the mold wall had been reached.

The mold was then allowed to cool to 60° C. and subsequently filled with the mixture intended to form the rigid foam. This mixture was prepared immediately before-hand by intensive mixing of the components of the rigid foam system (Example 1(b)). The material as a whole was left for about 10 minutes in the mold heated to 60° C., after which a composite sheet having an approximately 1 mm thick, solid, elastic skin and an approximately 8 mm thick, rigid, foamed core layer adhering extremely firmly thereto could be removed from the mold.

Total gross density: 445 kg/m³.
Surface hardness: Shore D: 43; Shore A: 93.

EXAMPLE 2

(2a) One-component system for the skin

A mixture of 90 parts by weight of a polyoxypropylene glycol polyether containing terminal aromatic amino groups and having an NH number of 47.5 (prepared in accordance with DOS No. 2,948,419 by hydrolysis of a prepolymer of 1 mole polyoxypropylene glycol, MW 2000, and 2 moles 2,4-toluylene diisocyanate), 10.6 parts by weight of a polyether obtained by addition of propylene oxide and ethylene oxide with trimethylolpropane (OH number 28, functionality 3, MW 6000), 0.075 parts by weight of Jeffamine T 403 (a trifunctional polyoxypropylene glycol polyether containing terminal primary amino groups, molecular weight 403; a product of Texaco) and 0.2 parts by weight of dimethylbenzylamine was intensively mixed with 19.0 parts by weight of a diisocyanate based on 2,4-toluylene diisocyanate containing urea groups prepared in accordance with DOS No. 3,438,527, Example 8c. The liquid mixture hardened at 90° C. to form a polyurethane elastomer having the following properties:

Tensile strength (DIN 53 504): 11.4 MPa.
Elongation at break (DIN 53 504): 200%.
Tear propagation resistance (DIN 53 515): 31.8 kN/m.

Shore hardness (DIN 53 505): A 88; D: 32.
Elasticity (DIN 53 512): 45%.

(2b) Foam system for back-filling

The polyol component was 100 parts by weight of a trifunctional polyoxypropylene glycol polyether containing 17 wt. % of a polyoxyethylene terminal block, molecular weight 6000, OH number 28, 2 parts by weight of water, 0.5 parts by weight of a metal carboxylate (k-acetate) as catalysat, 2 parts by weight of primer TN (polyester based on adipinic acid, hexandiol-1.6 and trimethylol propane of Bayer AG, Leverkusen, W. Germany).

The polyisocyanate was a polyisocyanate obtained by phosgenation of aniline-formaldehyde condensate and having a viscosity of $\leq 200$ mPas at 25° C. and an NCO content of approx. 31 wt. %.

100 parts by weight of the polyol component were mixed with 36 parts by weight of the polyisocyanate component.
Cream time: 25 seconds.
Rise time: 4 minutes 45 seconds.
Gel time: 4 minutes 30 seconds.

(2c) Apparatus

A typical slush molding apparatus was used. Its basic structure is described on page 11 of the present specification. The apparatus was made up f an approximately 300×300×100 mm shaped upper shell and a pot-like lower shell. The two shells were held together by clamps and were sealed by means of a flat seal at the points of contact between the two shells. The mold was mounted in a flexible rotary unit. A heatable water duct was situated at the upper edge of the lower shell.

In addition, a standard heating cabinet was used to heat the contour-imparting upper shell to the working temperature and to condition the molded skin formed.

(2d) Test procedure

The degassed one-component system of (2a) kept at 25° C. was introduced into the lower shell in a quantity such that the upper shell was at least completely filled.

The upper edge of the lower shell was kept at a temperature of 60° C. by means of water to prevent the transfer of heat between the heated upper shell and the lower shell.

After the flat seal had been put in, the heated upper shell was clamped to the lower shell and the entire mold was turned through 180° C. about its horizontal axis. The one-component system thus ran from the lower shell into the heated upper shell and began to harden on the wall of the upper shell.

The wall thickness of the elastomer could be controlled through the temperature of the upper shell and the contact time of the heated upper shell with the one-component system.

After a predetermined time (in the present case 30 seconds), the two-part mold was turned back to its starting position.

During the following so-called draining period (in the present case 30 to 60 seconds), the unhardened one-component system ran back into the lower shell. The one-component system which had hardened on the wall of the upper shell was separated with the upper shell from the lower shell, heated in the upper shell for 10 minutes at 120° C. in the heating cabinet and then removed from the upper shell after cooling.

The molded skin was then placed in a standard foaming mold having the same contour as the upper shell and was backfoamed by standard methods with the polyurethane system of (2b).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite plastic molding made up of a plastic foam having a polyurethane skin produced by heating a reactive one-component system composed of
   (a) a finely divided polyisocyanate in which from 0.1 to 25 equivalent percent of the isocyanate groups have been deactivated and
   (b) a polyamine and/or polyol having a molecular weight of from 400 to 8000
   to form the polyurethane skin and joining the plastic foam to the polyurethane skin.

2. The molding of claim 1 in which the isocyanate groups of the polyisocyanate have been deactivated by reaction with a polyamine, hydrazine, alkyl hydrazine, hydrazide, amidine and/or guanidine.

3. The molding of claim 1 in which the one-component system further includes
   (c) a chain extending agent selected from aromatic polyamines having molecular weights of from 108 to 399, aliphatic polyols having molecular weights of from 62 to 399, cycloaliphatic polyols having molecular weights of from 62 to 399 and mixtures thereof.

4. The molding of claim 3 in which the one-component system further includes (d) a catalyst.

5. The molding of claim 1 in which the one-component system further includes (d) a catalyst.

6. The molding of claim 1 in which the plastic foam is a polyurethane foam.

7. The molding of claim 1 in which the polyurethane skin is foamed.

8. A process for the production of a composite plastic molding composed of a plastic foam and a polyurethane skin comprising
   (1) thermally hardening a reactive one-component polyurethane system composed of
      (a) a finely divided polyisocyanate in which from 0.1 to 25 equivalent percent of the isocyanate groups have been deactivated and
      (b) a polyamine and/or polyol having a molecular weight of from 400 to 8000 and
   (2) joining the product of (1) to the plastic foam.

9. The process of claim 8 in which the isocyanate groups of the polyisocyanate have been deactivated by reaction with a polyamine, hydrazine, alkyl hydrazine, hydrazide, amidine and/or guanidine.

10. The process of claim 8 in which the one-component system further includes
    (c) a chain extending agent selected from aromatic polyamines having molecular weights of from 108 to 399, aliphatic polyols having molecular weights of from 62 to 399, cycloaliphatic polyols having molecular weights of from 62 to 399, and mixtures thereof.

11. The process of claim 10 in which the one-component system further includes (d) a catalyst.

12. The process of claim 8 in which the one-component system further includes (d) a catalyst.

13. The process of claim 8 in which the plastic foam is a polyurethane foam.

14. The process of claim 8 in which the polyurethane skin is foamed.

15. The process of claim 8 in which the polyurethane skin is formed on the inner wall of a mold and then back-foamed with the plastic foam.

16. The process of claim 15 in which the polyurethane skin is removed from the inner wall of the mold in which it was formed and introduced into a second mold in which it is back-foamed with the plastic foam.

* * * * *